(12) United States Patent
Salsman

(10) Patent No.: US 6,592,218 B1
(45) Date of Patent: *Jul. 15, 2003

(54) INK JET RECORDING METHOD

(75) Inventor: Robert Keith Salsman, Hoschton, GA (US)

(73) Assignee: Seydel Research, Inc., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,129

(22) Filed: Mar. 10, 1999

(51) Int. Cl.$^7$ ................................. B41J 3/407
(52) U.S. Cl. ...................... 347/106; 428/195
(58) Field of Search .............. 428/195; 521/48, 521/48.5, 272; 429/500; 347/105, 106

(56) References Cited

U.S. PATENT DOCUMENTS 4,713,289 A * 12/1987 Shiffler .................. 428/361
4,977,191 A * 12/1990 Salsman .................. 521/48
5,021,544 A * 6/1991 Padget et al. .............. 528/272
5,281,630 A * 1/1994 Salsman .................. 521/48.5

* cited by examiner

Primary Examiner—Bruce H. Hess
Assistant Examiner—Michael E Grendzynski
(74) Attorney, Agent, or Firm—McNair Law Firm, P.A.

(57) ABSTRACT

The present invention describes an ink jet printing sheet comprised of a supporting substrate surface treated with a water soluble or water dispersible polyester composition, said polyester having polyoxyalklylene moieties in an effective amount to reduce ink feathering. The instant invention is also directed to papers and transparencies coated with surface treated with a water soluble or water dispersible sulfonated polyester composition, said polyester having polyoxyalkylene moieties in an effective amount to reduce ink feathering. A typical polyester resin useful in the present invention is the reaction product of 20–50% by weight of terephthalate polymer, 10–60% by weight of at least one glycol and 5–70% by weight of at least one oxyalkylated polyol.

4 Claims, 2 Drawing Sheets

 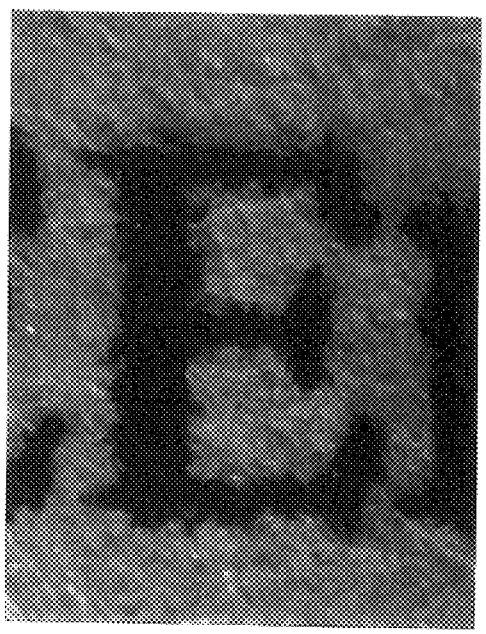
Fig. 1                    Fig. 2

INK JET RECORDING METHOD

FIELD OF THE INVENTION

The present invention relates to improved cellulosic paper sheets or synthetic paper sheets having improved sharpness when used with inkjet printers. More specifically, this invention relates to inkjet printable sheets having improved properties. This invention also relates to a coated type ink jet recording sheet. More particularly, it relates to a coated type ink jet recording sheet for use in an ink jet recording system that employs water-base inks. The product of the instant invention exhibits a high rate of absorption of the ink deposited on the recording sheet so as to allow a clear color to develop, providing an image having circular dots and sharply defined edges, having a high surface strength and the same touch and feel during use as plain paper, and being able to record images with high resolution that are water-proof. The ink jet recording sheet of the present invention may be used in recording, printing and writing employing water-base ink. The sheet of the present invention can be a cellulosic paper, a transparent sheet derived from synthetic polymers or any substrate which is usable in printing operations.

The present invention also relates to a recording sheet, and more particularly to an inkjet recording sheet prepared from a cellulosic support such as paper, on which there is applied a coating providing superior image performance. This invention relates generally to transparencies, and more specifically the present invention is directed to transparencies with certain coatings thereover and the use of these transparencies in ink jet printing processes.

BACKGROUND OF THE INVENTION

The history of improving the print quality of paper is based on the need to get the color to stay where it is applied. This need coincides with a need for the ink to dry as rapidly as possibly due to higher printing speeds. Current technology has been to apply a particulate, usually silica, to the paper surface to act as small dams in order to get the ink to go into the sheet of the paper and not spread out on the surface. If the ink spreads on the surface, the sharpness of the image becomes degraded due to the ink vehicle carrying the color with it. This is called "feathering" in the print paper industry. So if the paper sheet remains fairly hydrophilic and absorbent, feathering occurs easily. One approach to the problem is to make the surface more hydrophobic. The problem here is that the inks do not dry as rapidly if they are sitting on a hydrophobic surface and there is a need for solvent based inks for faster drying. This is something that is not desirable from an environmental standpoint and the ink manufacturer's have been trying to move away from this.

In order for an ink jet recording system to be able to produce high quality recorded images, it is required that the substrate employed be such that the ink deposited on the surface of the recording sheet i.e., paper spreads to form a true circle and is absorbed quickly in a controlled manner without becoming irregularly spread on the surface, and that the surface structure be such as to promote coloration of the deposited ink.

In order to improve the capacity to absorb ink and to provide a higher ink absorption rate and that spreading of the ink may be controlled so as to realize a dot shape close to a true circle without adversely affecting the water-proof quality and the color brightness, it is necessary to drastically increase the amount of specialty coating materials coated on the substrate surface to a value not less than 10 $g/m^2$. With a coating amount of not more than 10 $g/m^2$, the dot shape and coloration are not satisfactory and the dot size control that is necessary for good quality image reproduction cannot be achieved. However, if the coating amount is increased, the cost of the paper is raised and the feel of the plain paper and its suitability for use may not be acceptable.

Non-coated type ink jet paper has recently become popular in view of its suitability from the standpoint of cost, printing quality and adaptability to use as office paper. It is known with regard to the production of such ink jet papers to add for example liquid-absorbing pigments such as silica or heavy calcium carbonate at the time of making the paper. However, this type of ink jet paper presents certain problems in that the ink may not develop sufficient color brightness when applied to and absorbed by the paper on account of certain optical properties of the pulp and filler customarily used so that a clear coloration of a quality comparable to that obtained when using coated paper is not attainable. Furthermore spreading of the ink cannot be prevented and the ink absorption rate and capacity are low.

For applications in which importance is attached to the brightness of color images, a coated type of paper is employed which has a coating layer consisting essentially of white pigments having superior water absorption properties so that the above-described dot shape and color brightness can be obtained. In the absence of a specialized type of processing, it is impossible to provide water-proof images if water-base ink is used with any of these types of paper.

The most successful inkjet recording sheets presently in use employ non-cellulosic polymer supports because of their exceptional smoothness. However, as the use of inkjet printers becomes more widespread, there is a growing need for developing inkjet sheets using cheaper and more economical substrates such as paper. The use of paper as a substrate for an inkjet recording sheet provides both advantages and disadvantages. One obvious advantage is cost, but another advantage is the ability of the paper to absorb the ink vehicle rapidly during printing. The main disadvantage is a lack of smoothness as compared with non-cellulosic, polymer substrates.

Inkjet systems are comprised of three components, the printer, the ink and the recording sheet. The printer controls the size, number and placement of the ink droplets and contains the transport system. The ink provides the colorants which form the images, and the recording sheet provides the medium or substrate which accepts and holds the ink. The quality and archivability of ink jet prints is a function of the total system. However, the composition and interaction of the ink and the recording sheet affect the quality and archivability of the imaged product.

There are two primary requirements for inkjet printing. The first is that the coating, and the substrate in the case of paper supports, must be absorbent enough to immobilize the vehicle of the inks so that the inks will not smear permitting fast ink drying and high printing speeds. The second requirement is that the coating provide a means for keeping the dyes in the inks on the surface of the sheet with minimal spreading, tailing or blurring of dots to provide a sharp image. If the dyes are not kept on the surface of the sheet the colors could fade since the dyes will become diluted by the high light scattering ability of the preferred pigments used in inkjet coatings.

Fast drying properties have been achieved in the past by incorporating silica or other large specific surface area pigments in the inkjet recording layer so as to increase ink absorption. However, an inkjet recording layer with a pigment of large specific surface area provides a surface having low smoothness. As a result, the appearance of the image deteriorates and the reproduction of the image becomes unsatisfactory. Enhanced smoothness can be achieved, however, by calendering or supercalendering the inkjet recording sheet, but this action tends to destroy the porosity of the inkjet recording layer resulting in a decrease in the ink absorption and reduced drying properties. Nevertheless, emphasis in the prior art has dictated the use of nonflake-like pigments for use in inkjet coatings. Nonflake-like pigments include calcium carbonate, silicas, calcined clays and other such pigments whereas flaky pigments include clays, talc and mica.

Typical binders for inkjet coatings disclosed in the prior art are water soluble polymeric binders including polyvinyl alcohol, polyvinyl alcohol copolymers such as poly (vinyl alcohol-co-vinyl acetate), hydroxypropyl cellulose, acrylic resins such as poly (methyl methacrylate/ethyl acrylate/ acrylic acid), sodium alginate, water soluble phenol formaldehyde resins, carboxylated styrene butadiene polymers, carboxymethyl cellulose, hydroxyurethanes, soluble collagen gelatin, hydrolyzed ethylene vinyl acetate polymers, and polysaccharides such as xanthene gum, gum tragacanth, locust bean gum, guar gum, and agur, etc. Also noted in the prior art are aqueous dispersions of poly(vinylpyrrolidone), vinylpyrrolidone-vinyl acetate copolymers, or mixtures thereof.

Although the papers currently used by the consumer are suitable for their intended purposes, there remains a need for papers with new coatings that are useful in ink jet printing processes, including color processes, and that will enable the formulation of images with high optical densities. Additionally, there is a need for treated papers that can be selected for ink jet color printing processes. Another need resides in providing papers the fibers of which are coated continuously with certain polyester compositions as illustrated herein. There is also a need to provide papers for ink jet, dot matrix, typewriters and crayon printing processes, and wherein images of high optical density, such as greater than one, are obtained in some embodiments of the present invention.

In accordance with the present invention, novel coating formulations have been discovered which utilizes many of the components disclosed in our prior U.S. Pat. No. 4,977, 191 but which produces superior image performance when applied to a paper substrate and printed with an inkjet printer.

The present invention is characterized by careful selection of water soluble and dispersible polyester materials to achieve a high level of success.

BRIEF DESCRIPTION OF THE FIGURES

The figures described below are photographs taken of an "E" that has been printed with a Cannon Bubble Jet Printer on paper that was coated with the coatings of the present invention.

FIG. 1 shows a printed paper which is a Control-Coated with a 10% solution of K-66F starch.

FIG. 2 shows a printed paper which was coated with a mixture of 90 parts of a 10% K-66F starch solution and 10 parts of 2018NS-28.

Figure 3:
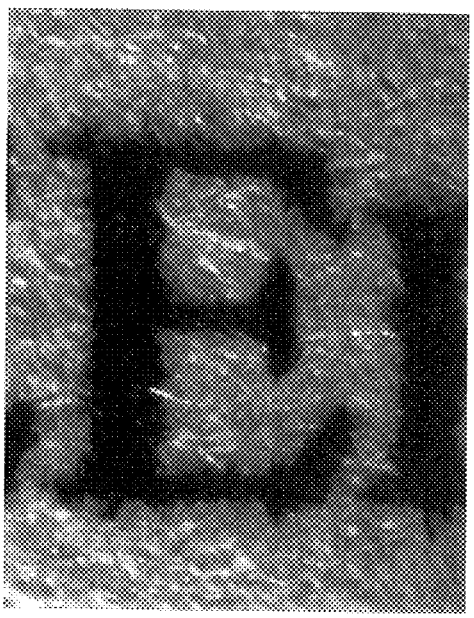
FIG. 3 illustrates a printed paper coated with a mixture of 80 parts of a 10% K-66F starch solution and 20 parts of 2018NS-28.
Figure 4:
FIG. 4 describes a printed paper which was coated with a mixture of 70 parts of a 10% K-66F starch solution and 20 parts of 2018NS-28.

The four figures show that the sharpness of the "E" has improved with the addition of the 2018NS-28. The paper coated with 20% of the 2018NS-28 resin appears to be the best. The image is darker due to more ink on the surface and the edges are sharper due to less "feathering".

OBJECTS OF THE INVENTION

It is an object of the present invention to provide a paper having a surface coating which provides increased sharpness when used in printing.

It is another object of the present invention to provide transparencies for use with inkjet printers having a dispersible polyester coating for improved image sharpness.

Another object of the present invention resides in the provision of ink jet papers with certain coatings thereon.

Also, in another object of the present invention there are provided inkjet papers with certain coatings thereon thus enabling images with high optical densities.

Another object of the present invention resides in papers that permit the substantial elimination of feathering caused by poor inter-drop coalescence during mixing of the primary colors to generate secondary colors.

Furthermore, in another object of the present invention there are provided ink jet papers that enable elimination of bleeding and feathering of colors due to intermingling or diffusion of dyes when different colors, for example black, are printed together with another color like magenta.

Another object of the present invention resides in ink jet transparencies that have substantial permanence for extended time periods.

A further object of the present invention relates to ink jet transparencies with a coating comprised of water dispersible polyester resins.

Still, an additional object of the present invention relates to transparencies and papers with specific coatings which enable water and glycol absorption from the inks selected in a rapid manner thereby enabling such coatings to be particularly useful in known ink jet printers.

In yet another object of the present invention there are provided coatings which are compatible with filled papers, sized papers and opaque Mylars, and which coatings will enable the aforementioned substrates to generate high optical density images with ink jet processes.

In still another object of the present invention there are provided water dispersible polyester coatings for other substrates including paper products, which coatings enable an increase in the shelf life of the resulting products permitting their usefulness in various printers subsequent to extended storage, for example, in excess of six months in unsealed envelopes.

A further object of this invention is to provide a process for coating inkjet papers with water dispersible polyester resins.

We have surprisingly found that these objects are achieved by the use of at least one water-soluble or water-dispersible polyester resin disclosed in my prior U.S. Pat. Nos. 4,977,191 and 5,281,630.

SUMMARY OF THE INVENTION

The present invention is directed to a printing sheet comprised of a supporting substrate surface treated with a water soluble or water dispersible polyester composition, said polyester having polyoxyalklylene moieties in an effective amount to reduce ink feathering.

The instant invention is directed to an ink jet printing sheet comprised of a supporting substrate surface treated with a water soluble or water dispersible polyester composition, said polyester having polyoxyalklylene moieties in an effective amount to reduce ink feathering.

The present invention is also directed to an ink jet printing sheet comprised of a supporting substrate surface treated with a water soluble or water dispersible sulfonated polyester composition, said polyester having polyoxyalkylene moieties in an effective amount to reduce ink feathering.

The invention also relates to an inkjet recording sheet comprising a paper substrate bearing on at least one surface thereof an inkjet coating comprising a water soluble or water dispersible polyester resin which is the reaction product of 20–50% by weight of terephthalate polymer, 10–60% by weight of at least one glycol and 5–25% by weight of at least one oxyalkylated polyol.

The invention also describes a recording sheet comprising a paper substrate bearing on at least one surface thereof a coating comprising a water soluble or water dispersible polyester resin which is the reaction product of 20–50% by weight of terephthalate polymer, 10–80% by weight of at least one glycol and 5–70% by weight of at least one oxyalkylated polyol.

The subject matter of the instant invention also relates to an inkjet recording sheet comprising a paper substrate bearing on at least one surface thereof an inkjet coating comprising a water soluble or water dispersible polyester resin which is the reaction product of 20–50% by weight of terephthalate polymer, 10–70% by weight of at least one glycol and 5–60% by weight of at least one oxyalkylated polyol.

The invention also features a transparency comprising a supporting substrate and coated thereon a composition comprising a water soluble or water dispersible polyester resin which is the reaction product of 20–50% by weight of terephthalate polymer, 10–70% by weight of at least one glycol and 5–60% by weight of at least one oxyalkylated polyol.

The invention further describes an inkjet recording sheet comprising a paper substrate bearing on at least one surface thereof an inkjet coating comprising the reaction product of 20–50% by weight of terephathlate polymer, 10–40% by weight of at least one glycol and 5–25% by weight of at least one oxyalkylated polyol to produce a prepolymer resin having hydroxyalkyl functionality, wherein the prepolymer resin is further reacted with about 0.10 mole to about 0.50 mole of an alpha, beta unsaturated dicarboxylic acid per 100 g of prepolymer resin and a thus produced resin, terminated by a residue of an alpha, beta-ethylenically unsaturated dicarboxylic acid, is reacted with about 0.5 mole to about 1.5 mole of a sulfite per mole of alpha, beta-ethylenically unsaturated dicarboxylic acid residue to produce a sulfonated-terminated resin.

The instant invention also is directed to a transparency comprising a supporting substrate and coated thereon a composition comprising the reaction product of 20–50% by weight of terephathlate polymer, 10–40% by weight of at least one glycol and 5–25% by weight of at least one oxyalkylated polyol to produce a prepolymer resin having hydroxyalkyl functionality, wherein the prepolymer resin is further reacted with about 0.10 mole to about 0.50 mole of an alpha, beta unsaturated dicarboxylic acid per 100 g of prepolymer resin and a thus produced resin, terminated by a residue of an alpha, beta-ethylenically unsaturated dicarboxyclic acid, is reacted with about 0.5 mole to about 1.5 mole of a sulfite per mole of alpha, beta-ethylenically unsaturated dicarboxylic acid residue to produce a sulfonated-terminated resin.

The invention is also generally directed to printing papers having a polyester coating which include sufficient polyoxyethylene moities so as to avoid feathering.

DETAILED DESCRIPTION OF THE INVENTION

We have discovered that the water-soluble or water-dispersible polyester resin compositions as well as their sulfonated derivatives resins as disclosed and claimed herein, are particularly useful for coating papers and other substrates such as transparencies which are used in inkjet printing applications.

Of particular importance with respect to the instant subject matter is that the resins contain an effective and sufficient amount of polyoxyalkylene moieties so as to minimize feathering when printing with an inkjet printer. The different components used to practice the invention are further described below.

Ink Receptivity Coatings

The resins which are useful in the present invention are water-soluble or water-dispersible polyester resins which are made from virgin terephthalate polymers, waste terephthalate polymers, including bottles, sheet material, textile wastes and the like. The waste terephthalate plastics may be bought from recyclers and include, but are not limited to, material identified as "PET rock." The waste terephthalate can be characterized by the unit formula

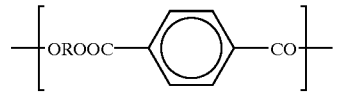

wherein R is the residue of an aliphatic or cycloaliphatic glycol of 2–10 carbons or of an oxygenated glycol of the formula

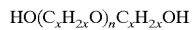

wherein x is an integer from 2–4 and n is 1–10.

Preferably the terephthalate polymer or waste terephthalate polymer is polyethylene terephthalate, polybutylene terephthalate, poly-(cyclohexanedimethanol terephthalate) or a mixture thereof.

It will be understood that, for reasons of economy, the use of waste terephthalates is preferred. However, the use of virgin terephthalate resins is to be included within the scope of the disclosure and appended claims. The amount of terephthalate resin is typically 20–50% by weight.

The glycol with which the waste terephthalate polymer is reacted can be selected from among a variety of known dihydric alcohols. Preferred glycols include, but are not limited to, ethylene glycol, diethylene glycol, triethylene glycol, polyethylene glycol, cyclohexanedimethanol, propylene glycol, butylene glycol, neopentyl glycol, 1,5-pentanediol, 1,6-hexanediol or mixtures thereof. Most preferably, the glycol is a mixture of diethylene glycol and neopentyl glycol. The amount of glycol is typically 10–80% by weight.

The oxyalkylated polyol is derived from any polyol, having two or more alcohol functions. Polyols include ethylene glycol, glycerol, trimethylolpropane, trimethylolethane, pentaerythritol, erythritol, sorbitol, mannitol, other sugar alcohols or monosaccharides. The polyols are oxyalkylated with an alkylene oxide, including, but not limited, to ethylene oxide, propylene oxide, butylene oxide, amylene oxide, etc.

Preferably, the oxyalkylated polyol is glycerol, trimethylolpropane, trimethylolethane, pentaerythritol, erythritol or a monosaccharide, oxyalkylated with 5–30 moles of ethylene oxide, propylene oxide or a mixture thereof, per hydroxyl of the polyol. The amount of oxyalkylated polyol is typically in the range of 5–70% by weight.

The water-soluble or water-dispersible polyester resins can further include 3–15% by weight of trimellitic acid or anhydride as well as 1–10% by weight of polyol. Polyols are chosen as above.

The polyester resins can be made by heating waste terephthalate polymer, glycol, oxyalkylated polyol and, optionally, isophthalic acid together in any order until breakdown and reconstruction of a mixed terephthalate-isophthalate ester has occurred. This process normally requires, for acceptable reaction times, temperatures above about 150° C. to the decomposition point of the ester product.

In making the water-soluble or water-dispersible polyesters, it is preferred to heat the waste terephthalate polymer, glycol and oxyalkylated polyol above about 150° C. to partially breakdown the terephthalate and then to heat the thus-produced intermediate with isophthalic acid under similar temperature conditions.

A most preferred product is that obtained by heating waste terephthalate polymer, glycol and oxyalkylated polyol above about 150° C. to produce an intermediate product, characterized by a 15-minute clear pill, and heating the thus-obtained intermediate product with isophthalic acid at a temperature of at least 150° C.

Polyester resins, containing trimellitic acid or trimellitic anhydride, are preferably made by heating an isophthalic acid-containing intermediate with trimellitic acid or trimellitic anhydride. It is preferred to obtain an intermediate, having a 15-minute clear pill, before reaction with isophthalic acid and then with trimellitic acid or anhydride.

Resins made from waste terephthalate polymer, glycol and isophthalic acid are preferably made by heating waste terephthalate polymer with at least one glycol above about 150° C. to produce an intermediate product, characterized by a 15-minute clear pill, and heating the thus-obtained intermediate product with isophthalic acid at a temperature of at least 150° C. Subsequent reaction with trimellitic acid or trimellitic anhydride is preferred.

Preferred terephthalate feeds are as above. Most preferred feeds are polyethylene terephthalate or poly(cyclohexanedimethanol terephthalate).

Glycols are as recited above. Particularly preferred is a mixture of diethylene glycol and cyclohexanedimethanol.

A preferred product is that comprising a reaction product of 20–50% by weight of polyethylene terephthalate, 10–30% by weight of diethylene glycol, 20–50% by weight of isophthalic acid and 3–15% by weight of trimetllitic acid or trimellitic anhydride.

A highly-preferred water-soluble or water-dispersible polyester resin comprises a reaction product of 20–50% by weight of polyethylene terephthalate, 10–30% by weight of diethylene glycol, 1–10% by weight of pentaerythritol, 5–25% by weight of oxyalkylated glycerol of 5–30 oxyalkyl units per hydroxyl, 20–50% by weight of isophthalic acid and 3–15% by weight of trimellitic acid or trimellitic anhydride.

The polyester resins are usually and preferably made using an ester-interchange catalyst. These catalysts are well known organometallic compounds, particularly compounds of tin or titanium. Preferred catalysts include tetraalkyl titanates, in which the alkyl is of up to 8 carbon atoms, as well as alkyl stannoic acids or dialkyl tin oxides, such as monobutyl stannoic acid or dioctyl tin oxide. Preferred catalysts include monobutyl stannoic acid and tetrapropyl or tetrabutyl titanate, or a mixture thereof.

Additional polyester resins which can be used in the practice of the instant invention are sulfonated water-soluble or water-dispersible polyester resin, comprising a reaction product of 20–50% by weight of terephthalate polymer, 10–40% by weight of at least one glycol and 5–25% by weight of at least one oxyalkylated polyol to produce a prepolymer resin, wherein the prepolymer resin is further reacted with about 0.10 mol to about 0.50 mol of an alpha, beta-ethylenically unsaturated dicarboxylic acid per 100 g of prepolymer resin and a thus-produced resin, terminated by a residue of an alpha,beta-ethylenically unsaturated dicarboxylic acid, is reacted with about 0.5 mol to about 1.5 mol of a sulfite per mol of alpha,beta-ethylenically unsaturated dicarboxylic acid residue to produce a sulfonate-terminated resin. Preferred resins also comprise 20–50% by weight of isophthalic acid.

Another useful sulfonated resin is a water-soluble or water-dispersible polyester resin, comprising a reaction product of 20–50% by weight of waste terephthalate polymer, 10–50% by weight of at least one glycol and 20–50% by weight of isophthalic acid to produce a prepolymer resin, wherein the prepolymer resin is further reacted with about 0.10 mol to about 0.50 mol of an alpha, beta-ethylenically unsaturated dicarboxylic acid per 100 g of prepolymer resin and a thus-produced resin, terminated by a residue of an alpha,beta-ethylenically unsaturated dicarboxylic acid is reacted with about 0.5 mol to about 1.5 mol of a sulfite per mol of alpha,beta-ethylenically unsaturated dicarboxylic acid residue to produce a sulfonate-terminated resin. The sulfonated products described above are thoroughly described in my prior U.S. Pat. No. 5,281,630 whose entire contents are incorporated by reference herein. Also the entire contents of my U.S. Pat. No. 4,977,191 are incorporated by reference herein.

The resinous products obtained are generally taken up in relatively concentrated aqueous solutions of alkali metal or ammonium hydroxides or carbonates. The concentration employed can be determined by routine experimentation. However, if shipping of the concentrated aqueous solutions to a point of use is contemplated, it is preferred to produce highly concentrated solutions. It is within the scope of this invention to produce initial solutions or dispersions, containing 20–30% or more of resin solids.

When the water disperible polyester compositions of the instant invention are applied to the surface of a paper intended to receive ink, i.e. printing paper, the paper surface is modified so that when ink is applied the pigment or dyestuff in the ink is immediately precipitated from its dispersion vehicle or carrier. The dispersion vehicle or carrier is not affected and in fact, due to the increased hydrophilicity of the paper, is absorbed quickly into the sheet and dries rapidly. Because the ink has been precipitated or immobilized it is not carried further into the paper sheet or spread out by the vehicle into the surrounding area of the paper. The overall effect is greatly reduced feathering and much improved print sharpness and quality without sacrificing drying time.

Although applicant does not wish to be bound by his mechanistic interpretation of how the present invention works, it is believed that the compositional aspects of the polyester resins that seem to relate to this increased printability are the polyoxylethylene moiety in combination with a terephthalate and/or isophthalate polymer section. The sulfonated polyester resins are also believed to act in the same way i.e., due to the presence of the polyoxyethylene moiety. The polyoxyethylene moiety may in fact act to grab the dyestuff and hold on to it. Once the dyestuff has been grabbed from the vehicle the polymer composed of terephthalic, isophthalic, or phthalic esters may act to precipitate it from the surrounding vehicle and isolate so that the original dispersants cannot redisperse it.

By the term polyoxyethylene moiety applicant intends to include PEGs (polyethylene glycols or polymers of ethylene oxide) of various molecular weights, ethoxylated alcohols like the ethoxylated glycerin (these would include ethoxylated higher alcohols used as non-ionic surfactants), ethoxylated acids (these would be products that could be bought precondensed either with an acid or ethoxylated with ethylene oxide), and ethoxylated amines. Those moieties are typically incorporated into the polyester backbone, but could by themselves be additives to the compositions.

The coating compositions that are suitable for practicing the invention have a polyoxyethylene moiety combined either through esterification or even emulsification (i.e. just combining a surfactant or polyethylene glycol) with a polymer composed of terephthalic, isophthalic, or phthalic esters or combinations thereof would or could give this effect on a paper surface. In addition, combination with various other ingredients that are used to treat the surface of paper such as but not limited to starch, polyvinyl alcohol, carboxyl methylated cellulose, protein, clay, calcium carbonate, gelatin, silica, etc., etc. These other ingredients could act merely as carriers and/or diluents or they could contribute to other desirable properties that our compositions alone may not supply.

Substrates Useful for Practicing the Invention

Useful substrates for practicing the invention include both cellulose and non-cellulose type supports, although cellulose substrates such as paper are preferred. The degree of sizing for the cellulosic substrate can be from 1 second to about 1000 seconds as measured by the Hercules size test (HST), as described in TAPPI standards T530 pm-83. The support is chosen so its HST value is compatible with the volume and composition of the ink drop in the printer to be used. The preferred HST is within the range of from about 200 to 500 seconds, and most preferably between about 300 to 400 seconds. The surfaces of the cellulosic substrate on which the inkjet print coating is applied should be relatively smooth with a BEKK smoothness of about 500 seconds. In addition, cellulosic sheets of high brightness are preferred which have good opacity.

The printing paper employed in the present invention is made by a conventional paper-making process from chemical pulp, etc., a sizing agent, and a filler as the main components and additionally necessary paper-making auxiliary agents. The pulp may contain mechanical pulp, or a regenerated waste paper pulp additionally. Otherwise the mechanical pulp or the waste paper pulp may be the main constituent thereof without any disadvantage. The sizing agent incorporated in the paper includes rosin sizes, alkyl ketene dimers, alkenylsuccinic anhydrides, petroleum resin sizes, epichlorohydrin, cationic starch, acrylamide, etc.

The printing paper of the present invention is obtained by treating further the above printing paper for sizepress coating at the printing face with a usual surface coating material such as starch to improve the surface strength and the printing characteristics of the paper. In a preferred aspect of the instant invention, the starch may be conbined with the water dispersible polyester compositions and applied to the paper at the sizepress during the manufacturing of the paper.

Examples of substrates selected for the ink jet transparencies include Mylar, commercially available from E. I. duPont; Melinex, commercially available from Imperials Chemical, Inc.; Celanar, commercially available from Celanese; polycarbonates, especially Lexan; polysulfones; cellulose triacetate; polyvinylchlorides; and the like, with Mylar being particularly preferred in view of its availability and lower costs. The substrate selected for the transparencies are generally of a thickness of from about 50 microns to about 100 microns, and preferably are of a thickness of from 50 microns to about 70 microns. Thicknesses outside these ranges can be selected provided the objectives of the present invention are achieved.

Other suitable substrate is comprised of sized blends of hardwood kraft and softwood kraft fibers which blends contain from about 10 percent to 90 percent by weight of soft wood and from about 90 to about 10 percent by weight of hardwood. Examples of hardwood include Seagull W dry bleached hardwood kraft preferably present, for example, in one embodiment in an amount of 70 percent by weight. Examples of softwood include La Tuque dry bleached softwood kraft present, for example, in one embodiment in an amount of 30 percent by weight. These sized substrates may also contain fillers and pigments in effective amounts of from about 1 to about 60 percent by weight such as clay (available from Georgia Kaolin Company, Astro-fil 90 clay, Engelhard Ansilex clay), titanium dioxide (available from Tioxide Company-Anatase grade AHR), calcium silicate CH-427-97-8, XP-974 (J. M. Huber Corporation), and the like. Also, the sized substrates may contain various effective amounts of sizing chemicals (for example from about 0.25 percent to about 25 percent by weight of pulp) such as Mon size (available from Monsanto Company), Hercon-76 (available from Hercules Company), Alum (available from Allied Chemicals as Iron free alum)m, and retention aid (available from Allied Colloids as Percol 292). The sizing values of papers, including the commercial papers that can be selected for the present invention in an embodiment thereof, vary between about 0.4 second to about 4,685 seconds, however, papers in the sizing range of 50 seconds to 300 seconds are preferred, primarily to decrease costs. The porosity values of the substrates which are preferably porous varies from about 100 to about 1,260 mil/minute and preferably from about 100 to about 600 mil/minute to permit, for example, the use of these papers for various printing technologies such as thermal transfer, liquid toner development, xerography, ink jet processes, and the like.

It should be noted that the coated papers of the instant invention are not limited to use with inkjet printers. One knowledgeable in the art of printing paper and textile surfaces might expect the desired effect to be observed on other types of printing operations, especially anywhere an ink is applied to lay down an image where excessive migration of dyestuff is undesirable.

Methods for Applying Coatings to Substrates

The inkjet coating is applied to one or both surfaces of the substrate by a coating means known to those skilled in the art. Suitable coating methods include conventional roll coaters or blade coating methods, e.g., air, knife, trailing blade, etc. The coating formulation may be applied directly to the surface of the substrate from a single solution or it may be applied over a previously applied holdout coating where desired. The differences between the processes are many, including process speed, coating viscosity, coating solids, types of materials that can be applied, thedepth of penetration of the material into the substrate, and the surface characteristics of the substrate coming out of the coating process which ultimately determines the quality of the recording sheet produced.

The water dispersible polyester coating of the present invention can be applied to paper by a number of known techniques including size press treatment, dip coating, reverse roll coating, extrusion coating, and the like. The surface treatment of the papers can, for example, be accomplished on a KRK size press by dip coating and by solvent extrusion on a Faustel Coater. The KRK size press is a lab size press that simulates a commercial size press. This size press is normally sheet fed as contrasted to a commercial size press wherein a continuous web is selected. On the KRK size press in an embodiment, the sheet of paper is taped by one end to the carrier mechanism plate. The speed of the test and the roll pressures are set, and the coating solution is poured into the solution tank. A 4 liter stainless steel beaker, for example, is situated underneath for retaining the solution overflow. The coating solution is cycled once through the system (without moving the paper sheet) to wet the surface of the rolls and then returned to the feed tank where it is cycled the second time. While the rolls are being "wetted", the sheet is fed through the rolls by pressing the carrier mechanism start button. The coated paper is then removed from the carrier mechanism plate and is placed on a 12 inch by 40 inch sheet of 750 micron thick Teflon for support and is dried on the Dynamic Former drying drum and is held under restraint to prevent shrinkage. The drying temperature is approximately 105° C. This method of coating treats both sides of the paper simultaneously.

In dip coating, a web of the material to be coated is transported below the surface of the coating of, for example, water dispersible polyester by a single roll in such a manner that the exposed site is saturated, followed by the removal of any excess coating by the squeeze rolls and dried at 10° C. in an air dryer. The method of surface treating paper using a coater results in a continuous sheet of paper with the coating material applied first to one side and then to the second side of the paper selected. With a known slot extrusion process, there is selected a flat die with the die lips in close proximity to the web of paper to be coated, resulting in a continuous film of the solution evenly distributed across the sheet, and thereafter dried in an air dryer at 100° C.

Other coating operations that could work include spray application, a light coat on the water box at the end of the paper machine, or even a special printer that applied our material just prior to printing on. Any way the polymer is applied so that it is present on the paper surface before the ink hits its would work.

Amounts that work are limited only in the lower direction. In other words a lot on the surface will only give a glossier surface. On the lower limit we know that 20% by volume with a 10% starch solution starts to achieve the desired properties on the size press. Since this will likely deposit 6 to 8 pounds per tons of solids, the lower limit of our product may be down around 1 pound per ton for printing paper. Lower amounts are also possible provided the carrier itself gives some benefit.

Printing Technique and Drying Time

The imaging technique in ink jet printing involves the use of one or more ink jet assemblies connected to a pressurized source of ink, which is comprised of water, glycols, and a colorant such as magenta, cyan, yellow or black dyes. Each individual ink jet includes a very small orifice usually of a diameter of 0.0024 inch, which is energized by magneto restrictive piezoelectric means for the purpose of emitting a continuous stream of uniform droplets of ink at a rate of 33 to 75 kilohertz. This stream of droplets is desirably directed onto the surface of a moving web of, for example, the treated paper of the present invention, which stream is controlled to permit the formation of printed characters in response to video signals derived from an electronic character generator and in response to an electrostatic deflection system.

The drying time of images obtained with the treated papers of the present application is the time for zero image-offset and can be measured as follows: a line comprised of different color sequences is drawn on the ink jet paper using the droplets of inks from the inkjet heads moving from left to right and back. Thereafter, this image is purposely smeared with the pinch roll of the printer by fast forwarding the paper mechanically while the pinch roll is on the top of the imaged line. This whole procedure takes about two seconds to accomplish. In the event there is no offset of the printed image on the unprinted paper, the drying time of the image is considered as less than two seconds.

Best Mode for Carrying Out the Invention

The following examples will more fully illustrate the embodiments of this invention. Therefore, they should not be construed as limiting of the remainder of the disclosure in any way. All parts, percentage and proportions referred to herein and in the appended claims are by weight unless otherwise indicated.

Synthesis of Paper Coating Compositions

EXAMPLE 1

Preparation of Water-soluble Resin from Scrap Polyethylene Terephthalate

The following ingredients are used:

| parts by weight | |
|---|---|
| 19.05 | diethylene glycol |
| 5.04 | neopentyl glycol |
| 2.18 | pentaerythritol |
| 11.01 | ethoxylated glycerine (17–19 moles of ethylene oxide, molecular weight 850, Witco Chemical Co., Witconol (4073) |
| 0.08 | monobutyl stannoic acid |
| 30.47 | scrap polyethylene terephthalate |
| 25.87 | isophthalic acid |
| 6.2 | trimellitic anhydride |
| 0.1 | tetrapropyl titanate |

The alcohols are charged to a reaction vessel and heated to 200° C. to remove water. Titanate catalyst is charged to the hot alcohol mixture, after which PET is. added in three batches. The initial third of the PET is added to the alcohols at 200° C., whereupon the temperature in the reactor is increased to 240° C. and maintained at 240° C. for 15 min. Half of the remaining PET is added and the temperature is kept at 240° C. for 15 min more, after which the remaining third of the PET is added. The temperature in the reactor is kept at 240° C. until a 15-minute clear pill is obtained.

Clear pill time is determined by placing a drop of the reaction mixture on a Petri dish and starting a timer. The time at which the drop becomes opaque is the limit of the clear pill.

When the 15-minute clear pill is obtained, the temperature in the reactor is reduced to 185° C. and monobutyl stannoic acid and then isophthalic acid are charged to the reactor. The resulting mixture is heated until an acid value of 15–20 is obtained. The resulting mixture is cooled to 180° C. and the trimellitic anhydride is charged to the reactor. At the end of 30 minutes, all of the trimellitic anhydride has reacted. The resulting resinous mixture is dissolved to a level of 25% solids in aqueous ammonia solution.

EXAMPLE 2

Preparation of Water-soluble Resin from Scrap Polybutylene Terephthalate
The following materials are used:

| parts by weight | |
| --- | --- |
| 20.0 | triethylene glycol |
| 5.0 | neopentyl glycol |
| 2.5 | trimethylolpropane |
| 11.5 | ethoxylated trimethylolpropane (10 moles of ethylene oxide) |
| 0.1 | monohexyl stannoic acid |
| 29.5 | scrap polybutylene terephthalate |
| 30.0 | isophthalic acid |
| 1.0 | tetra(isopropyl) titanate |

The PBT is broken down as in Example 1 to produce a resinuous material, which is taken up in dilute sodium hydroxide solution to produce a stable dispersion.

EXAMPLE 3

Preparation of Water-soluble Resin from Scrap Poly (cyclohexanedimethanol Terephthalate)
The following ingredients are used:

| parts by weight | |
| --- | --- |
| 25.0 | ethylene glycol |
| 20.0 | ethoxylated pentaerythritol(15 moles of ethylene oxide) |
| 30.0 | scrap poly (cyclohexanedimethanol terephthalate) |
| 24.8 | isophthalic acid |
| 0.2 | tetrabutyl titanate |

The procedure of Example 1 is followed. The resinous product obtained is dissolved in aqueous KOH solution, to a solids content of 20%.

EXAMPLE 4

Preparation of Water-soluble Resin from Scrap Polyethylene Terephthalate
The following ingredients are used:

| parts by weight | |
| --- | --- |
| 11.0 | diethylene glycol |
| 21.55 | cyclohexanedimethanol |
| 30.0 | scrap polyethylene terephthalate |
| 0.08 | monobutyl stannoic acid |
| 3.91 | polyethylene glycol (Pluracol PEG 4000) |
| 0.1 | tetrapropyl titanate |
| 23.36 | isophthalic acid |
| 10.0 | trimellitic anhydride |

The glycols are charged to a reactor and heated to 200° C. to remove water. Titanate catalyst is charged to the reactor, after which one third of the PET is added and the temperature in the reactor is raised to 240° C. After 15 minutes' heating at this temperature, half of the remaining PET is charged to the reactor. After 15 minutes more, the rest of the PET is added. The temperature in the reactor is kept at 240° C. until a 15-minute clear pill is obtained.

The temperature in the reactor is dropped to 185° C. Monobutyl stannoic acid is charged to the reactor, followed by the isophthalic acid. The mixture in the reactor is cooked until an acid value of 15–20 is obtained. The temperature may be raised to 220° C. during this step. The resulting product is cooled to 180° C. and the trimellitic anhydride is added. After 1 hr at this temperature, all of the trimellitic anhydride has reacted. The resulting resin is ground into a coarse powder, which is blended with sodium carbonate.

EXAMPLE 5

Following the procedure of Example 4, the following materials are used to make a water soluble polyester resin:

| Components | % by weight |
| --- | --- |
| PEG 1450 | 60.87 |
| PET Virgin | 25.86 |
| Ethylene glycol | 3.76 |
| Fastcat 4100 | 0.11 |
| Tetrapropyl titanate | 0.09 |
| Isophthalic acid | 9.31 |

EXAMPLE 6

Preparation of Water-soluble Resin from Scrap Poly (Cyclohexanedimethanol Terephthalate)

The following ingredients are used:

| parts by weight | |
| --- | --- |
| 20.0 | tetraethylene glycol |
| 0.1 | monobutyl stannoic acid |
| 0.1 | tetrabutyl titanate |
| 40.0 | scrap poly (cyclohexanedimethanol terephthalate) |
| 35.0 | isophthalic acid |
| 3.0 | trimellitic anhydride |

A resin is prepared as in Example 5. The hot resin is taken up in ammonium hydroxide solution to a solids content of 27%.

EXAMPLE 7

Preparation of Water-soluble Resin from Scrap Polybutylene Terephthalate

The following materials are used:

| parts by weight | |
|---|---|
| 15.0 | ethylene glycol |
| 12.0 | neopentyl glycol |
| 40.0 | scrap PBT |
| 32.0 | isophthalic acid |
| 0.1 | monobutyl stannoic acid |
| 0.1 | tetrapropyl titanate |

The resinous product, obtained as in Example 5, is chopped up into a coarse powder and blended with potassium carbonate.

EXAMPLE 8

Preparation of Water Soluble Resin from Monomers

The following materials are used to make a water soluble polyester resin:

| Components | % by weight | |
|---|---|---|
| PEG 1450 | 59.81 | |
| Ethylene glycol | 11.94 | |
| Fastcat 4100 | 0.10 | |
| Terephthalic Acid | 18.27 | |
| Isophthalic acid | 9.14 | |
| Cyanox | 0.74 | Post added anti-oxidant |

The above components are polycondensed using standard polymerization techniques well known in the polyester art.

EXAMPLE 9

Following the procedure of Example 4, the following materials are used to make a water soluble polyester resin:

| Components | % by weight |
|---|---|
| PEG 1450 | 60.87 |
| PET Virgin | 25.86 |
| Ethylene glycol | 3.76 |
| Fastcat 4100 | 0.11 |
| Tetrapropyl titanate | 0.09 |
| Isophthalic acid | 9.31 |

EXAMPLE 10

Sulfonation of Polyester Resin (a) A mixture of 151.2 g of prepolymer resin, prepared as in Example 1, 37.6 g of maleic anhydride (0.385 mol), 36.0 of sodium metabisulfite (0.189 mol) and 225 g of water are used. The prepolymer and maleic anhydride are charged to a round-bottom flask, fitted out with a reflux condenser, Dean-Stark trap, stirrer and thermometer. The mixture is heated as follows:

| Time | Temp. | Observations |
|---|---|---|
| 9:30 | room | charge materials |
| 9:45 | 165° C. | exotherm, mixture clear |
| 10:10 | 165° C. | add 0.25 g. of Fascut 200 water evolution begins |
| 10:20 | 185° C. | water evolution is too fast |
| 10:35 | 185° C. | water evolution continues |
| 11:30 | 185° C. | acid value = 37.0 |
| 12:00 | 185° C. | gelation occurring, stop experiment |

(b) A similar reaction is performed using 48.6 g of sodium sulfite (0.376 mol).

| Time | Temp | Observations |
|---|---|---|
| 2:00 | 160° C. | heat prepolymer and maleic anhydride |
| 2:15 | 90° C. | add sodium sulfite (solution in 225 g of water), the reaction mixture becomes dear |
| | 90° C. | continue heating |

The pH of the resulting product is 5.8.

(c) A similar reaction is done, using as reactants 107.1 g of prepolymer of Example 1, 18.9 g of isophthalic acid, 36.9 g of maleic anhydride (0.376 mol), 47.1 g of sodium sulfite (0.373 mol) and 90.0 g of water.

| Time | Temp. | Observations |
|---|---|---|
| 11:00 | room | charge prepolymer and isophthalic acid |
| 11:15 | 210° C. | mixture clear, no water evolution |
| 11:30 | 225° C. | cool mixture |
| next day | | |
| 9:45 | 80° C. | charge maleic anhydride and drop temperature |
| 10:20 | 50° C. | maleic anhydride dissolves |
| 10:30 | 80° C. | exothermic reaction to about 120 C. |
| 11:00 | 100° C. | mixture appears tackier; add water |
| | 62° C. | add part of sodium sulfite |
| 11:10 | 80° C. | exothermic reaction |
| 11:14 | 75° C. | mixture becomes clearer after ¾ of sodium sulfite added |
| 11:25 | 95° C. | heat at end of sodium sulfite addition |
| 11:40 | 400° C. | cool to room temperature. |

The product is clear amber, viscosity, 1,960 cps.

(d) A similar reaction is done, using as reactants 96.0 g of prepolymer of Example 1, 30.0 g of isophthalic acid, 36.9 g of maleic anhydride (0.376 mol), 47.1 g of sodium sulfite (0.373 mol) and 90.0 g of water.

| Time | Temp. | Observations |
|---|---|---|
| 1:30 | room | add isophthalic acid to prepolymer |
| 1:45 | 200° C. | water evolving |
| 1:55 | 230° C. | water evolving rapidly, polymer clearing |
| 2:07 | 240° C. | water evolution slowing |
| 2:30 | 100° C. | begin maleic anhydride addition |
| 2:37 | 80° C. | begin gentle heating |
| 2:45 | 130° C. | exotherm weaker |
| 4:45 | 100° C. | add water |
| 4:47 | 60° C. | add portion of sodium sulfite |
| 5:00 | 90° C. | strong exotherm, requires cooling |
| 5:05 | 90° C. | continue heating, complete addition of sodium sulfite |

The product (70% solids) is completely clear and water thin at 25° C. The solution is placed in an oven at 70° C. After 13 days' standing, the solution becomes noticeably more viscous; after 15 days' standing, solids separate.

(e) A similar reaction is done, first chain extending a prepolymer of Example 1 (217.14 g, 96% real) with 82.86 g of isophthalic acid. Smaller amounts of maleic anhydride and sodium sulfite are used, than in the foregoing examples. The extended polymer (180 g), 13.6 g of maleic anhydride (0.138 mol), 12.8 g of sodium sulfite (0.101 mol) and 256.4 g of water are used.

| Time | Temp. | Observations |
|---|---|---|
| 9:00 | 90° C. | add isophthalic acid to prepolymer and heat |
| 10:00 | 200° C. | water evolution; theoretical amount is collected |
| 1:15 | 90° C. | 100 g of resin is removed, 180. g is further reacted |
| 1:30 | 120° C. | add maleic anhydride, hold temp. at 130 C. |
| 2:00 | 70° C. | add water (206.4 g) and sulfite, owing to the high viscosity of the product, add 50 g of water to give a thin emulsion |

This experiment shows that small amounts of maleic anhydride and sulfite do not give a sufficiently water-soluble product.

(f) Isophthalic acid chain-extended prepolymer of (e) (95.0 g) is reacted with 28.46 g of maleic anhydride (0.290 mol), 35.65 g of sodium sulfite (0.283 mol) and 159.31 g of water.

| Time | Temp. | Observations |
|---|---|---|
| 10:30 | room | heat chain-extended prepolymer to 100° C. |
| 10:40 | 100° C. | add maleic anhydride and heat |
| 10:45 | 135° C. | hold for 30 min |
| 10:50 | 150° C. | temp. rise |
| 10:55 | 100° C. | add water and sodium sulfite |
| 11:00 | 50° C. | exotherm begins |
| 11:05 | 70° C. | mixture clarifies, exotherm maximum is 74 C. |
| 11:10 | 90° C. | mixture thins at about 80° C.; hold at 90° C. for 10 min and cool. |

The resulting material (50% solids) is clear and fluid at room temperature.

(g) Prepolymer of Example 1 (244 g) is reacted with 45 g of isophthalic acid, 55.35 g of maleic anhydride (0.564 mol), 70.65 g of sodium sulfite (0.560 mol) and 135 g of water.

| Time | Temp. | Observations |
|---|---|---|
| 9:30 | room | charge prepolymer, add isophthalic acid and begin heating |
| 9:37 | 185° C. | Water evolution begins |
| 9:45 | 234° C. | product clear; 4 mL of water collects |
| 9:55 | 244° C. | more than 10 mL of water collects, water evolution slows |
| 10:10 | 240° C. | stop heating, acid value = 16.8, 12 mL of water collects (9.75 mL theor) |
| 10:45 | 80° C. | add maleic anhydride |
| 11:00 | 150° C. | heat to complete reaction of maleic anhydride |
| 11:20 | 110° C. | add water, cool to 70 C. |
| 11:24 | 70° C. | start addition of sodium sulfite |
| 11:30 | 95° C. | solution clarifies before all sodium sulfite is added |

EXAMPLE 11
Preparation of Resin from Scrap Polyethylene Terephthalate and After-treatment with Maleic Anhydride and Sodium Sulfite (a) Scrap polyethylene terephthalate (299.6 g) is broken down by alcoholysis with diethylene glycol (150 g) and pentaerythritol (50 g), using 0.4 g of tetraisopropyl titanate catalyst in alcohol.

| Time | Temp. | Observations |
|---|---|---|
| 10:15 | 200° C. | heat glycols to remove water, add catalyst and then 99.8 g of PET scrap |
| 10:30 | 230° C. | PET fusing in reactor |
| 10:35 | 235° C. | reactor contents clearing, some insolubles remain |
| 10:40 | 240° C. | add 99.8 g of PET scrap |
| 10:55 | 243° C. | clear mixture, distillate evolving rapidly |
| 11:05 | 243° C. | 12 mL of distillate collects, good clear pill |
| 11:15 | 240° C. | add 50 g of PET |
| 11:30 | 243° C. | clear pill, remove 150 g of material 12 mL of distillate |
| 1:15 | 80° C. | heat and add 50 g of PET |
| 1:40 | 234° C. | foams and clears, add defoamer next day |
| 9:20 | 234° C. | add 50 g of PET, hold 1 h, 3 h clear pill |

(b) Resin product from (a) (150.0 g) is reacted with 43.93 g of maleic anhydride (0.448 mol), 56.05 g of sodium sulfite (0.445 mol) and 107.1 g of water.

| Time | Temp. | Observations |
|---|---|---|
| 11:00 | 100° C. | add maleic anhydride to resin |
| 11:15 | 150° C. | hold for 30 min to complete reaction of maleic anhydride |
| 1:30 | 100° C. | add water |
| 1:33 | 74° C. | add half of sodium sulfite |
| 1:36 | 89° C. | slight exotherm, cool mixture |
| 1:39 | 85° C. | add remainder of sodium sulfite |

The product (70% solids) is very viscous. Dilution with 59.5 g of water (60% solids) gives a somewhat less viscous product. Dilution with 83.3 g of water (50% solids) results in a less viscous, clear solution, which slowly becomes hazy.

(c) Resin from (a) (76.0 g) is reacted with 33.4 g of maleic anhydride (0.340 mol), 42.5 g of sodium sulfite (0.337 mol) and 65.1 g of water.

| Time | Temp. | Observations |
|---|---|---|
| 3:15 | room | charge resin |
| 3:20 | 100° C. | charge maleic anhydride |
| 3:25 | 150° C. | all maleic anhydride reacts |
| 3:35 | 150° C. | begin cooling |
| 3:45 | 100° C. | add water |
| 3:47 | 70° C. | add half of sodium sulfite |
| 3:53 | 90° C. | stronger exotherm, cool mixture |
| 3:57 | 85° C. | add remainder of sodium sulfite |
| 4:05 | 92° C. | heat to complete reaction |

The product (70% solids) is clear initially and becomes hazy on standing at room temperature.

(d) Resin from (a) (140.0 g) is reacted with 42 g of maleic anhydride (0.428 mol), 52.5 g of sodium sulfite (0.416 mol) and 234.5 g of water to give a product, containing 50.0% by weight of solids.

| Time | Temp. | Observations |
|---|---|---|
| 3:45 | 120° C. | add maleic anhydride to resin |
| 3:55 | 130° C. | hold to complete reaction with anhydride |
| 4:15 | 110° C. | add water |

-continued

| Time | Temp. | Observations |
|---|---|---|
| 4:20 | 60° C. | add half of sodium sulfite |
| 4:25 | 78° C. | exothermic reaction, add remainder of sodium sulfite with cooling |
| 4:30 | 78° C. | exothermic reaction stops, product not completely clear |
| 5:00 | 40° C. | product translucent |
|  |  | next day product cloudier, very mobile |

EXAMPLE 12

Reaction of Prepolymers with Isophthalic Acid, Maleic Anhydride and Sodium Sulfite (a) Prepolymer of Example 1 (115.38 g) is reacted with 45.81 g of isophthalic acid, 48.33 g of maleic anhydride (0.492 mol), 60.43 g of sodium sulfite (0.479 mol) and 180.00 g of water in a three-neck round-bottom flask, fitted out with stirrer, Dean-Stark water trap, condenser, thermometer with thermowatch and heating mantle.

| Time | Temp. | Observations |
|---|---|---|
| 10:35 | room | charge prepolymer and isophthalic acid |
| 10:48 | 180° C. | water evolving |
| 11:00 | 230° C. | product clear, water evolving rapidly, 3–4 mL |
| 11:50 | 234° C. | 9 mL of water collected, acid no = 21.5 |
| 1:45 | 90° C. | add maleic anhydride |
| 1:55 | 150° C. | heat to complete reaction of maleic anhydride |
| 2:00 | 165° C. | turn off heating |
| 2:45 | 100° C. | add water |
| 2:50 | 60° C. | add half of sodium sulfite |
| 2:55 | 75° C. | add remainder of sodium sulfite, dilute highly viscous solution with 90 g of water (to 50% solids) |
| 4:00 | 45° C. | cool to room temperature, pH 4.5, sulfite smell strong, reheat to 90 C. for 15 min to remove sulfite. |

Addition of 100 g of 10% KOH solution to 400 g of 50% product reduces the pH to 5.0.

(b) Prepolymer (115.38 g) of Example 1, 45.81 g of isophthalic acid, 48.33 g of maleic anhydride (0.492 mol), and 60.48 g of sodium sulfite (0.480 mol) in 180.00 g of water are reacted.

| Time | Temp. | Observations |
|---|---|---|
| 9:45 | room | charge prepolymer and isophthalic acid |
| 10:00 | 200° C. | water evolving |
| 10:11 | 238° C. | mixture clear |
| 10:30 | 242° C. | 10 mL of water collects, acid value = 16.8 |
| 11:30 | 70° C. | add maleic anhydride and heat to 150° C. |
| 11:36 | 150° C. | exotherm to 162° C. |
| 1:30 | 110° C. | add small increments of water, no large increase in viscosity |
| 1:35 | 65° C. | thickens below about 75° C. |
| 1:42 | 75° C. | product flows more readily |
| 1:45 | 75° C. | add half of sodium sulfite, exotherm to 80° C. |
| 1:48 | 80° C. | add remainder of sodium sulfite, exotherm to 95° C., acid value = 43.2 |
| 2:40 | 78° C. | acid value = 40.8 |

Adding 5 g of KOH to 100 g of this solution (60% solids) does not affect its solubility or viscosity.

EXAMPLE 13

Reactions are run as in Example 11, using the following starting materials:

| | | |
|---|---|---|
| (a) | 100.0 | solid prepolymer of Example 4 |
|  | 34.8 | fumaric acid |
|  | 31.2 | sodium bisulfite |
|  | 80.0 | water |
| (b) | 100.0 | solid prepolymer of Example 6 |
|  | 38.0 | maleic acid |
|  | 37.8 | sodium sulfite |
|  | 90.0 | water |
| (c) | 100.0 | solid polymer of Example 1 |
|  | 40.0 | itaconic acid |
|  | 35.0 | ammonium sulfite |
|  | 100.0 | water |
| (d) | 100.0 | solid prepolymer of Example 4 |
|  | 35.0 | citraconic acid |
|  | 35.0 | sodium sulfite |
|  | 100.0 | water |
| (e) | 100.0 | solid prepolymer of Example 4 |
|  | 30.0 | isophthalic acid |
|  | 37.0 | maleic acid |
|  | 41.0 | sodium sulfite |
|  | 95.0 | water |

As stated above the most obvious effect of the coatings of the present invention is to minimize or reduce ink feathering as described above. This makes for a sharper image on the paper surface. In addition, other attributes that these compositions would supply would be a brighter image since little of the ink is diving into the paper sheet but is sitting on the surface, decreased mottling of the image due to differences in ink absortivity of the paper itself, and increased drying speed since the ink carrier is free to travel into the sheet or surrounding paper surface.

EXAMPLE 14

Standard Procedure to Apply Starch and Polyester Coatings

The following is the general laboratory method that was used to apply the starch and starch/polyester combinations:

1. The starch is cooked-up at 90 degrees Centigrade and then cooled to 60 degrees Centigrade after 30 minutes.
2. The starch solution is applied neat-10% solids-using a number 3 Meyer Rod and a level draw down table to a smooth sheet of bleached paper. The number 3-rod is supposed to duplicate the size press application.
3. The paper is then dried in the oven at 130 degrees Centigrade for 30 seconds. This duplicates the drying on the size machine after the size press.
4. Steps 1–3 are repeated using the quantities of resin by volume as stated on the Examples below.
5. The printing test is run after the sheet is allowed to cool rehydrate-24 hours.

The loadings were measured as the difference in dry weight of the sheet before and after cooling. A very wide range of loadings are possible depending upon the quality of the sheet and the speed of the paper machine. Low levels of add-ons achieve good results and certainly high add-ons to work even better. Since coating is a surface feature, thicker, i.e. heavier paper, would not need more loading and the expression of quantity per 1000 sq. ft makes more.

The average add-on was typically 0.1463 grams per one sheet of 11×8.5 inches or 0.6493 square feet. So for 1000/0.6493=1,540×0.1463=225 grams per thousand square feet or 4.96 pounds per thousand square feet of solids.

EXAMPLE 15

Using the procedure of Example 14 a control was coated with a 10% solution of K-66F starch which is a commercially available starch.

In examples 16–18, the resin designated as 2018NS-28 is the resin prepared as in Example 8 above and the concentration of the resin is 28% by weight.

EXAMPLE 16

A paper is coated with a mixture of 90 parts of a 10% K-66F starch solution and 10 parts of 2018NS-28 using the procedure of Example 14.

EXAMPLE 17

Using the procedure of Example 14, a paper is coated with a mixture of 80 parts of a 10% K-66F starch solution and 20 parts of 2018NS-28.

EXAMPLE 18

A paper is coated with a mixture of 70 parts of a 10% K-66F starch solution and 20 parts of 2018NS-28 using the procedure of Example 14.

EXAMPLE 19

Additional laboratory papers as shown below were manufactured by increasing levels of addition in a 10% starch solution as indicated below.

| | |
|---|---|
| Control | Starch Only (10% Solids) (Filmcote 54). |
| 1 | 60 g/liter EvCote P18-NS in 10% Starch Solution. |
| 2 | 120 g/liter EvCote P18-NS in 10% Starch Solution. |
| 3 | 100% P18-NS. |

The papers were tested on a Lexmark 7000 Color Jetprinter, a Hewlett-Packard 722C, and an Epson Stylus Color 600. In viewing the test prints, the image quality was improved substantially between the 60 g/liter and 120 g/liter addition levels. No significant improvement in image quality was seen in going from the 120 g/liter addition to the 100% P18-NS "neat" application. The optimum dosage level is in the range of 60 g/liter and 120 g/liter.

It can also be noted that the image quality at the 120 g/liter addition level was better than our "Machine-Enhanced" Ink Jet product or Hewlett-Packard's "Bright White" product, even though it was printed on uncalendered lab test sheets.

EXAMPLE 20

Sample Calculations for the Invention

Preliminary calculations show a content of 20% by volume (60 g/liter) and 40% by volume (120 g/liter) in the surface size.
Calculations:
Total Solids per liter:

(0.200 liter×28 g/liter)+(0.800 liter×100 g/liter=85.6 g solids per liter.

EvCote P18-NS
10% Filmcote 54

Average % Pick-Up in Lab=6.4%=0.064 lb. Solids per lb. Paper.
Assuming that the Pick-up of the P18-NS solids and the starch solids is directly proportional to their relative concentration in solution EvCote P18-NS pick-up will then be:

0.064 lb. Solids/lb. Paper×(5.6/80)=0.0045 lb. P18-NS solids/lb. paper

This is an equivalent to 8.96 lb. P18-NS solids/ton paper. The P18-NS resin is also described in Example 8.

From the foregoing description, one skilled in the art can easily ascertain the essential characteristics of this invention. A further understanding of the nature and advantage of this invention herein may be realized by reference to the remaining portions of the specification and the appended claims.

I claim:

1. A method for inkjet printing which reduces ink feathering, which method comprises: providing an inkjet printing sheet comprised of a supporting substrate surface treated with a water soluble or water dispersible polyester composition, said polyester composition comprising a polyester characterized by the unit formula

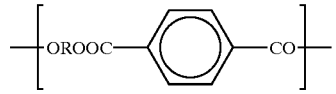

wherein R is the residue of an aliphatic or cycloaliphatic glycol of 2–10 carbons or of an oxygenated glycol of the formula:

$$HO(C_xH_{2x}O)_nC_xH_{2x}OH$$

wherein x is an integer from 2–4 and n is 1–10; and subsequently inkjet printing on said sheet.

2. A method for inkjet printing which reduces ink feathering, which method comprises: providing an ink jet printing sheet comprised of a supporting substrate surface treated with a water soluble or water dispersible sulfonated polyester composition, said polyester composition comprising a polyester characterized by the unit formula

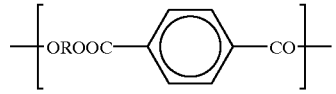

wherein R is the residue of an aliphatic or cycloaliphatic glycol of 2–10 carbons or of an oxygenated glycol of the formula:

$$HO(C_xH_{2x}O)_nC_xH_{2x}OH$$

wherein x is an integer from 2–4 and n is 1–10; and subsequently inkjet printing on said sheet.

3. A method for inkjet printing which reduces ink feathering, which method comprises: providing an inkjet recording sheet comprising a paper substrate bearing on at least one surface thereof an inkjet coating comprising a water soluble or water dispersible polyester resin which is the reaction product of 20–50% by weight of terephthalate polymer, 10–60% by weight of at least one glycol and 5–70% by weight of at least one oxyalkylated polyol; and subsequently inkjet printing on said sheet.

4. A method for inkjet printing which reduces ink feathering, which method comprises: providing a recording sheet comprising a paper substrate bearing on at least one surface thereof a coating composition comprising a water soluble or water dispersible polyester resin, wherein said resin is the reaction product of 20–50% by weight of terephthalate polymer, 10–80% by weight of at least one glycol and 5–70% by weight of at least one oxyalkylated polyol; and subsequently inkjet printing on said sheet.

* * * * *